United States Patent [19]

Wallace

[11] 4,377,891

[45] Mar. 29, 1983

[54] METHOD AND APPARATUS FOR FABRICATING MULTILAYER TUBULAR ELECTRICAL COMPONENTS

[75] Inventor: Clarence L. Wallace, Solana Beach, Calif.

[73] Assignee: Cladan Incorporated, San Marcos, Calif.

[21] Appl. No.: 206,367

[22] Filed: Nov. 13, 1980

[51] Int. Cl.³ .............................................. H01G 4/32
[52] U.S. Cl. .............................. 29/25.42; 242/67.1 R; 242/DIG. 3; 72/128; 72/146
[58] Field of Search ...................... 29/25.42; 242/7.06, 242/7.07, 56.1, 59, 67.1 R, 67.2, DIG. 3; 72/47, 146, 128

[56] References Cited

U.S. PATENT DOCUMENTS

| | | | |
|---|---|---|---|
| 2,389,420 | 11/1945 | Deyrup | 29/25.42 |
| 2,548,862 | 4/1951 | Brandt | 361/308 |
| 2,637,766 | 5/1953 | Grouse | 361/304 |
| 2,683,792 | 7/1954 | Dubilier | 219/69 R |
| 2,689,690 | 9/1954 | Dudchik | 242/67.1 R |
| 2,716,180 | 8/1955 | Dubilier | 29/25.42 |
| 2,727,297 | 12/1955 | Fralish et al. | 29/25.42 |
| 3,004,197 | 10/1961 | Rodriguez et al. | 361/305 |
| 3,274,468 | 9/1966 | Rodriguez et al. | 361/321 |
| 3,380,854 | 4/1968 | Robinson | 427/79 |
| 3,564,359 | 2/1971 | Coda et al. | 361/330 |
| 3,815,187 | 6/1974 | Hanold | 29/25 |
| 3,869,095 | 3/1975 | Diltz | 242/67.1 R |
| 4,050,273 | 9/1977 | Tada | 72/69 |

FOREIGN PATENT DOCUMENTS 759911 10/1956 United Kingdom ............... 29/25.41

Primary Examiner—Carl E. Hall
Assistant Examiner—P. W. Echols
Attorney, Agent, or Firm—William W. Haefliger

[57] ABSTRACT

A method of forming electrical structures embodying the following steps:
(a) providing a carrier sheet having electrodes formed thereon in spaced relation along a length dimension of the sheet, and
(b) spirally rolling said sheet about a roll-up axis to bring the electrodes into radial registration, the rolling including transmitting roll-up force to the carrier sheet from a web being translated endwise, adjacent the carrier.

23 Claims, 9 Drawing Figures

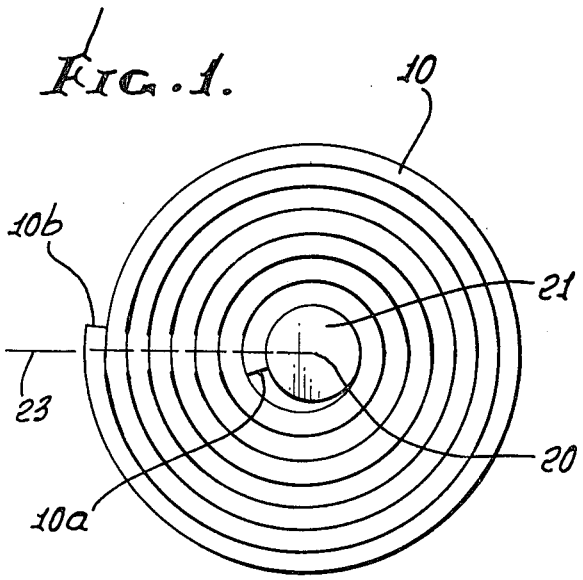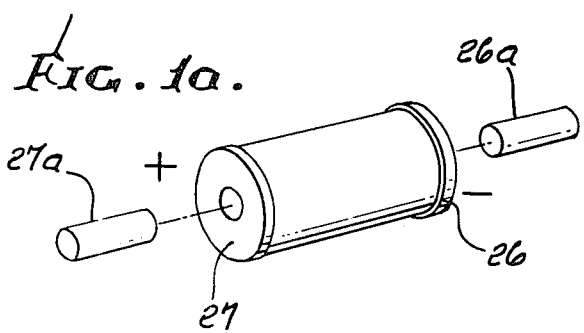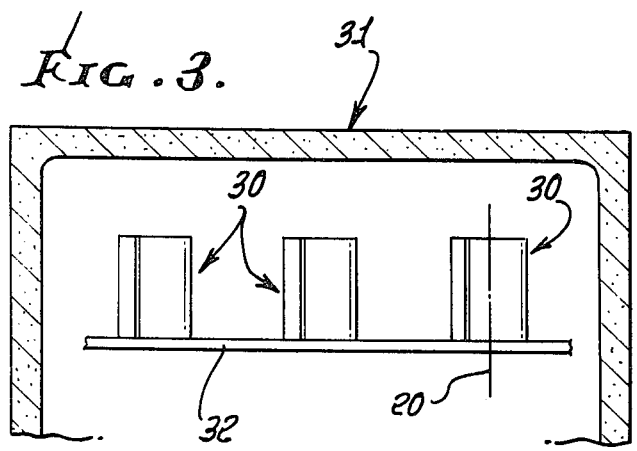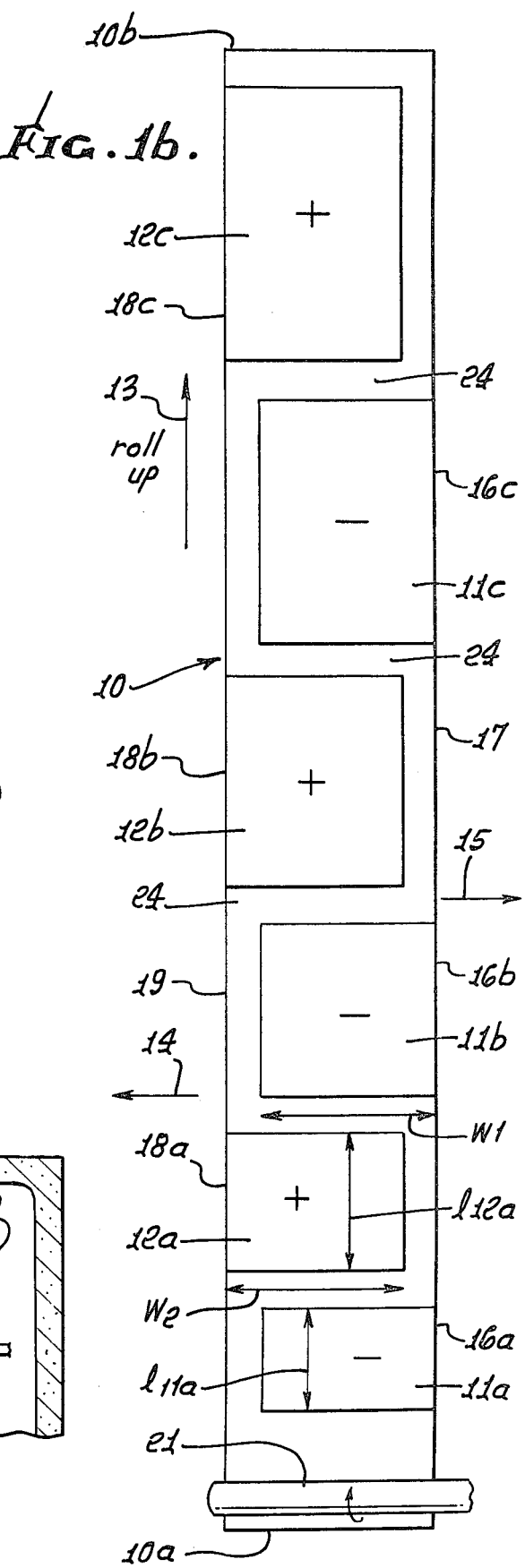

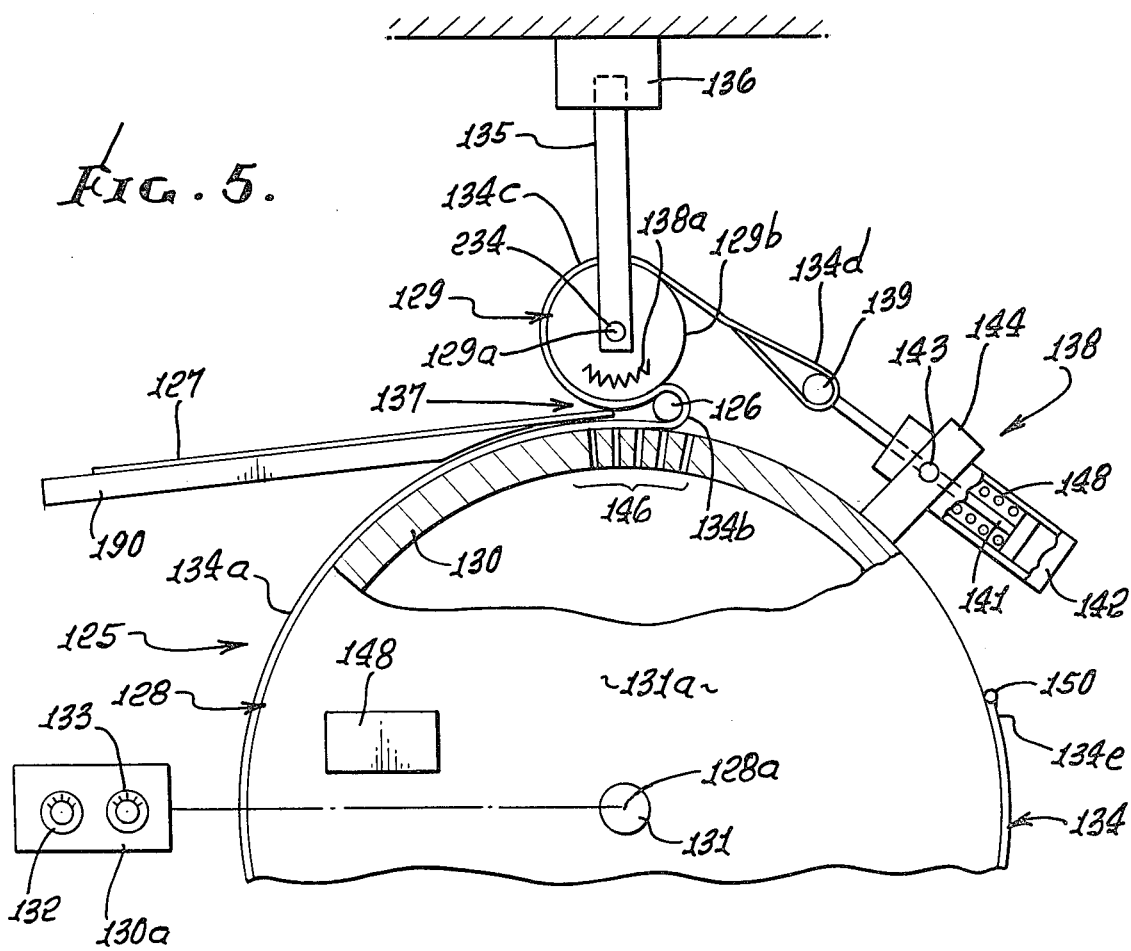
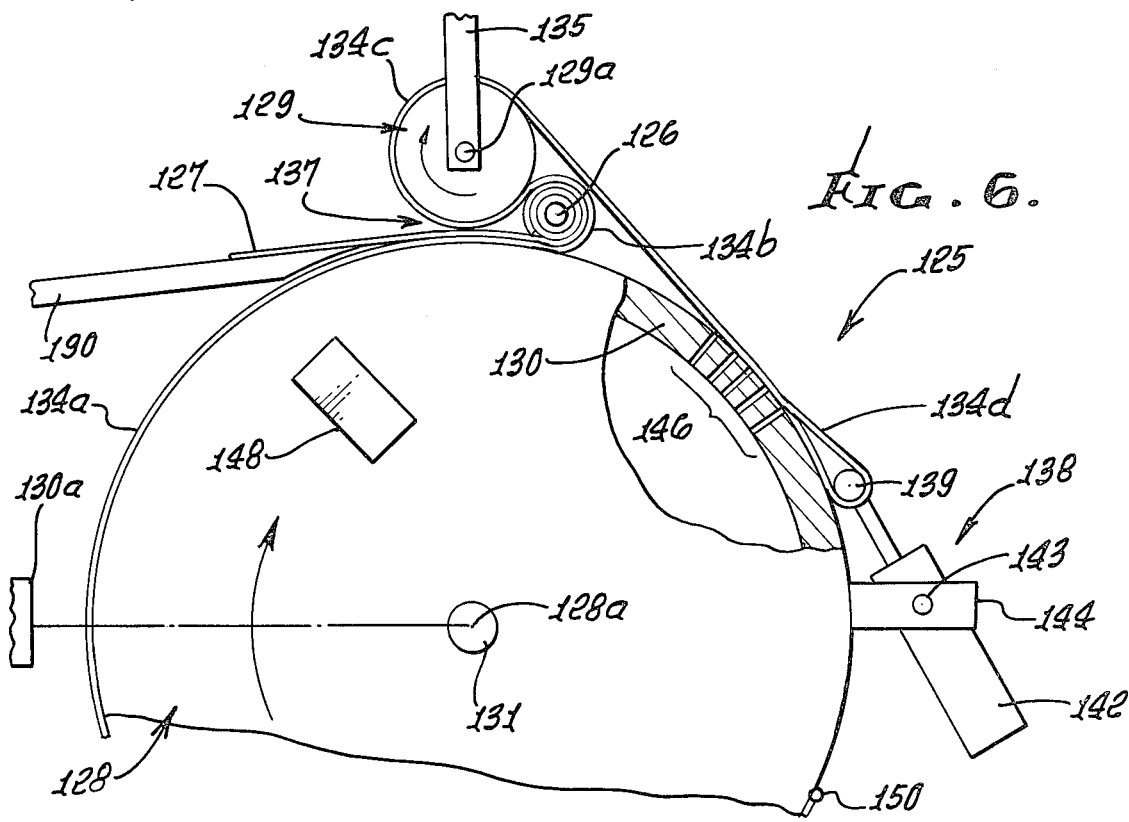

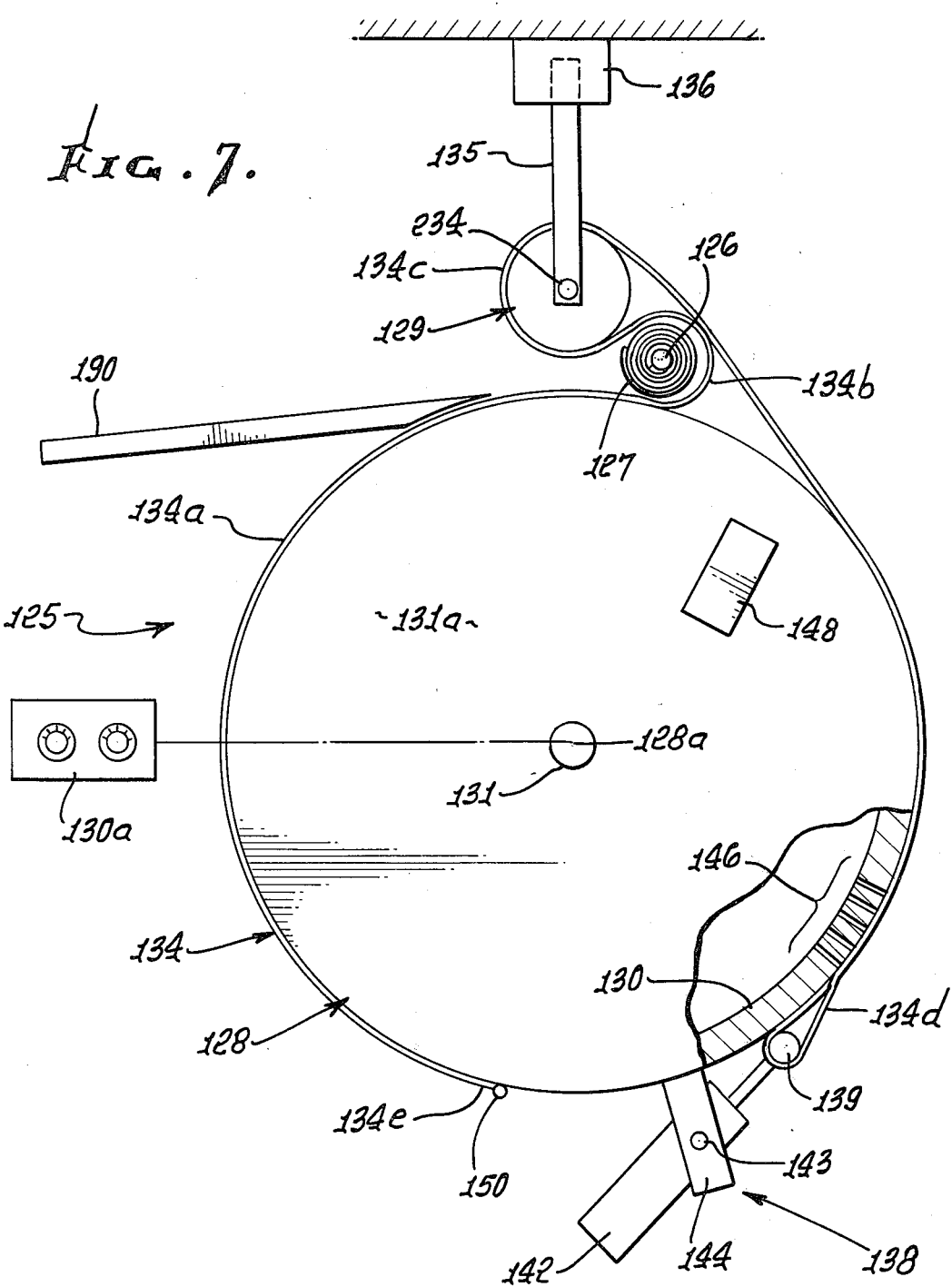

METHOD AND APPARATUS FOR FABRICATING MULTILAYER TUBULAR ELECTRICAL COMPONENTS

BACKGROUND OF THE INVENTION

This invention relates generally to the fabrication of electrical assemblies, as for example capacitors, and more particularly concerns novel apparatus and methods for producing spiral wound electrical assemblies that include sheets and electrodes thereon.

There is a constant need for lowering the cost and speeding the production of electrical components, such as capacitors, and without diminishing the operating performance and useful lives of such devices. While numerous capacitor designs and fabrication techniques have been proposed in the past, none to my knowledge have incorporated the unusual advantages in rapid, multiple unit roll-up fabrication, and concomitant results as are now afforded by the apparatus and methods described herein.

SUMMARY OF THE INVENTION

Fundamentally, the new method of forming electrical structures embodies the following steps:

(a) providing a carrier sheet having electrodes formed thereon in spaced relation along a length dimension of the sheet, and (b) spirally rolling said sheet about a roll-up axis to bring said electrodes into radial registration, said rolling including transmitting roll-up force to the carrier sheet from a web being translated endwise, adjacent the carrier.

As will appear, additional steps include exerting tension on the web to translate it endwise, for effecting carrier sheet wrap-up; the provision of back-up roll surfaces against which the web is urged during such wrap-up, in response to tension exertion on the web; the rotation of the roll surfaces in response to web translation so as to effect feeding of the carrier sheet and web into a nip formed by the roll surfaces; and the application of suction to hold the translating web against one roll surface.

Further steps include the locating of a mandrel to receive roll-up of the carrier sheet, and the feeding of the sheet between the mandrel and the web; and the transfer of heat to the typically ceramic ware (to be defined) being rolled up on the mandrel, to assist permanent deformation turning of that sheet.

As will also appear, and in the case of forming capacitors, the electrodes may be formed on the sheet in spaced relation along a length dimension of the sheet, such electrode forming carried out to provide the electrodes with progressively increasing length along the sheet length dimension. In this regard, the electrodes may successively be staggered along the sheet length dimension (the roll-up direction) and normal thereto; and certain electrodes typically may have first edges located in a first line in the roll-up direction, and other electrodes typically have second edges in a second line extending in that direction. As a result, roll-up brings the alternating electrodes into superposition, radially, to act as alternate plates of a multilayer capacitor, i.e. providing high capacitance per unit volume.

Further, the electrodes may consist of metallic ink, and the carrier sheet may consist of thin ceramic ware, as further defined herein. Also, multiple multilayer capacitors may be formed using a single rolled up sheet with columns of electrodes formed thereon, as will appear.

The novel apparatus to fabricate multilayer tubular electrical components by wrapping the carrier sheet and electrode assembly about a mandrel comprises:

(a) a first support roll, (b) a second support roll extending generally parallel to the first support roll, and (c) a roll-up force transmitting web wrapping at least partially about the support rolls and adapted to be translated while the rolls rotate to wrap the sheet about the mandrel as the sheet feeds progressively between the mandrel and web.

As will appear, tensioning means may be operatively connected with the web to tension same, so that the mandrel and carrier sheet are urged to the web toward a nip formed between the rolls; the web is fed from wrapping engagement with one roll into wrapping engagement with the other roll as the web translates, and the carrier sheet may be quickly fed between the mandrel and web to be wrapped about the mandrel by the web as it translates between the rolls; the web may be held against one roll as by suction, and heat may be transferred from the other roll via the web into the carrier sheet being wrapped on the mandrel, to assist permanent deformation of the sheet.

While the invention will be described in terms of capacitor fabrication, it is to be understood that it has application to electrical components subjected to wrapping, generally.

These and other objects and advantages of the invention, as well as the details of an illustrative embodiment, will be more fully understood from the following description and drawings, in which:

DRAWING DESCRIPTION

FIG. 1 is an enlarged cross section taken through a multilayer tubular capacitor, showing electroding;

FIG. 1a is an external perspective view of the FIG. 1 capacitor;

Figure 2:
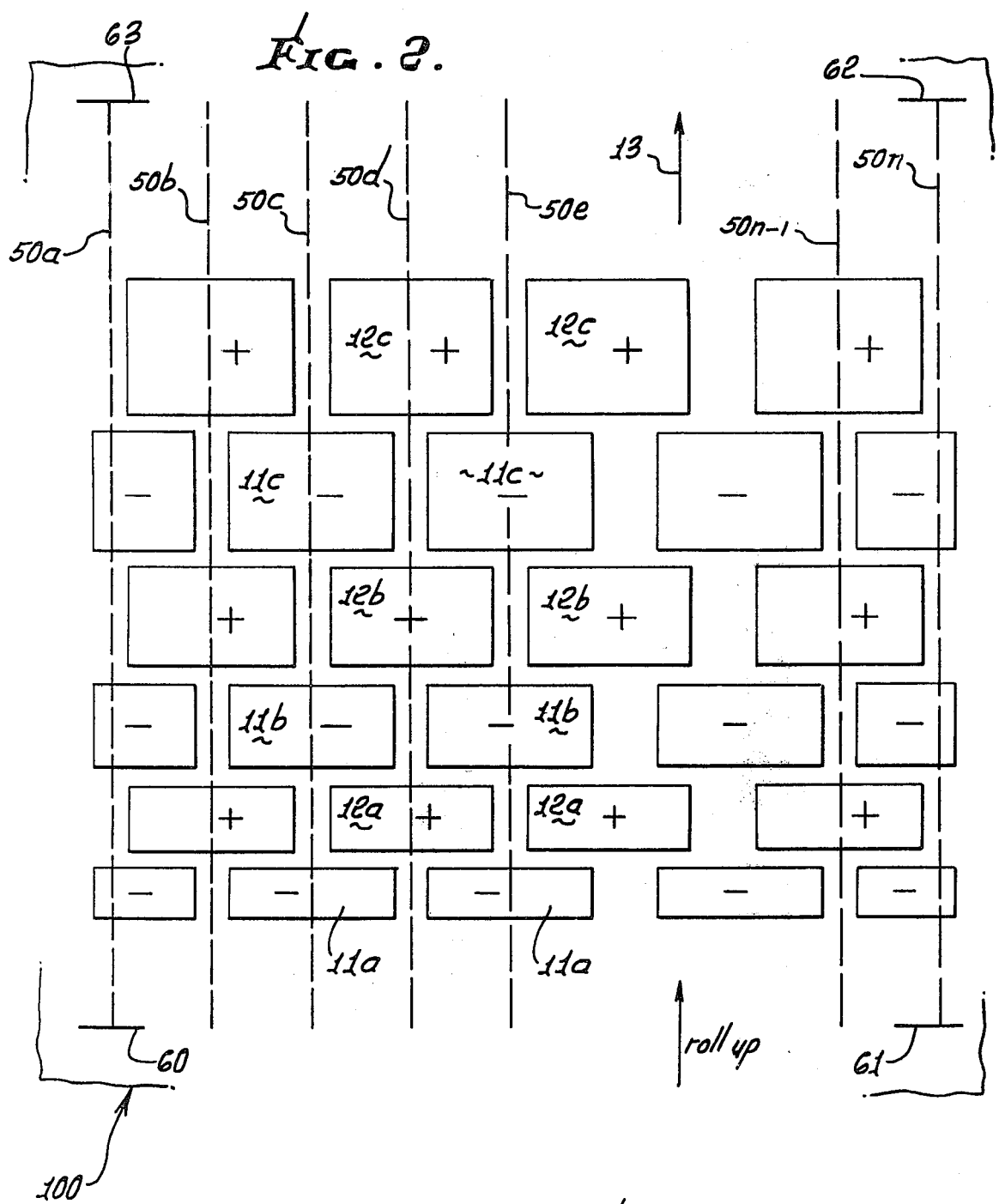
Figure 4:
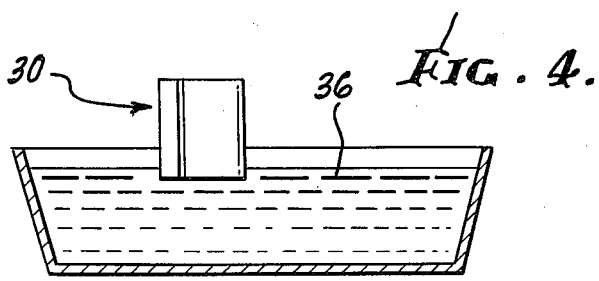

FIG. 1b in plan view showing the FIG. 1 capacitor in un-rolled state, i.e. prior to rolling;

FIG. 2 is a view like FIG. 1b but showing an electrode configuration enabling rapid fabrication;

FIGS. 3 and 4 show fabrication steps; and

FIGS. 5 to 7 are elevations showing electrical component wrapping apparatus in different stages of wrap completion.

DETAILED DESCRIPTION

The following is a definition of terms as used herein:

A. "Ink": as used herein refers to a thick vehicle suitable for screen-printing, which contains finely powdered metals such as silver, palladium platinum, gold, or other determined by compatibility with the dielectric ceramic used.

B. "Ceramic ware": a thin, flexible material upon which the "ink" mentioned above is printed. This material consists of a finely powdered ceramic suspended in a plastic binder which provides the necessary strength and handling properties. The ceramic material used is one of many which exhibit desirable electrical characteristics, such as high dielectric constant, good temperature stability, etc.

C. "Burnout": a process applied to structures consisting of layers of ceramic ware and metal ink, in which the temperature is raised at a controlled rate. All non-metallic and non-ceramic materials are "burned out" slowly enough that the structure is not disturbed by the escaping gases.

D. "Firing": a high-temperature treatment which causes the particles of ceramic to join together, and the finely powdered metal to unify into conductive sheets. Crystal growth in the ceramic is controlled to optimize electrical characteristics. Approximately 20% shrinkage of all linear dimensions results from this process.

E. "Mandrel": the rod around which the ceramic ware is wrapped. This rod may be removed before burnout if it is composed of metal, or it may be left in place if it is ceramic or some material which will burn away during burnout.

F. "Termination Ink": Consists of an organic vehicle containing powdered metal plus glass frit, which is usually applied to a fired capacitor by dipping. When fired on, the glass content promotes a good bond to the ceramic surface, while the metal content results in a good electrical connection.

Referring first to FIG. 1b a carrier sheet, which may preferably consist of ceramic ware, is indicated at 10. Formed on the sheet, as by screening, are a plurality of electrodes indicated at 11a–11c, and 12a–12c. The electrodes are spaced apart in the roll-up, longitudinal sheet length dimension indicated by arrow 13; they are preferably rectangular in shape, and they have increasing length. If "l" indicates the length dimension of an electrode, then the following relationship exists:

$$l11a < l12a < l11b < l12b < l11c < l12c,$$

wherein the electrodes sequence is:

11a, 12a, 11b, 12b, 11c 12c.

Thus, the electrodes have progressively increasing lengths, along the sheet length dimension or direction indicated by arrow 13.

Further, the electrodes are successively staggered along that direction and normal thereto; thus electrode 12a is leftwardly offset in normal or lateral direction 14 relative to electrode 11a, 11b is offset to the right in normal direction 15 relative to electrode 12a, electrode 12b is offset to the left relative to 11b - - - etc. Further, electrodes 11a, 11b and 11c are of the same width $w_1$ and extend in a column, and electrodes 12a - - - 12c are of the same width $w_2$, and extend in a column. Normally, $w_1$ is the same as $w_2$.

In addition, certain electrodes (as for example electrodes 11a - - - 11c) have first edges (right edges 16a - - - 16c) located in a first line, as for example is defined by carrier sheet edge 17; and other electrodes (as for example electrodes 12a - - - 12c) have second edges (left edges 18a - - - 18c) located in a second line, as for example is defined by carrier sheet edge 19. Edges 17 and 19 are parallel, as shown. Electrodes 11a - - - 11c are everywhere spaced from line 19, and electrodes 12a - - - 12c are everywhere spaced from line 17. Finally, successive electrodes along the direction 13 have progressively increasing area. To this end, if the electrodes all have the same width, then:

$$wl11a < wl12a < wl11b < wl12b < wl11c < wl12c$$

FIG. 1 shows the carrier sheet, i.e. ceramic ware 10 extending in a spiral about a roll-up axis 20 defined by the axis of cylindrical mandrel 21. See also that mandrel in FIG. 1b, in position for roll-up. Opposite ends of the sheet are indicated at 10a and 10b, and it will be noted that all electrodes as described are at one side of the sheet. A generally radial gap line is formed at 23 by the gaps between the electrodes, such gaps 24 for example having the same dimension in the direction of arrow 13 in FIG. 1b. Accordingly, in rolled up condition, the electrodes are precisely superposed over one another, in spiral arcs, and in the same sequence as shown in FIG. 1b, the carrier sheet having the same thickness throughout its length. Each electrode or capacitor "plate" corresponds to one wrap of the carrier, and the successive plates are longer as the ware is wrapped up.

FIG. 1a shows first and second, axially spaced apart end terminals such as caps 26 and 27 carried by the rolled up sheet or ware. First terminal 26 is in electrical contact with edges 16a - - - 16c of electrodes 11a - - - 11c; and second terminal 27 is in electrical contact with edges 18a - - - 18c of electrodes 12a - - - 12c. Thus, first terminal 26 is in contact with certain electrodes, and second terminal 27 is in electrical contact with other electrodes which extend in alternating relation with the certain electrodes, radially in axis 20.

In the above, the electrodes, typically consist of metallic "ink" as defined above. Certain of such inks and ceramic ware are described in U.S. Pat. No. 4,183,074 to Wallace.

After the rolling operation as described, the structure is unified by the application of isostatic radial compression (lamination). Burnout and firing of the wrapped structure are accomplished with the part standing up on end, i.e. with the axis 20 extending vertically. See FIG. 3, showing wrapped units 30 in burnout and firing oven 31, and standing on end on support 32. Thereafter, the end terminals 26 and 27 are applied.

The terminals 26 and 27 may be formed by coating the opposite ends of the wrap with an "end termination ink", as defined above. FIG. 4 shows the unit being dipped into ink 36 in a tray. After such end coating, a second firing at lower temperature is carried out to remove (volatilize) the non-metallic carrier in the ink, and fuse the powdered metal ink at each end of the wrap, in electrical contact with the edges of the electrodes.

The ceramic ware (carrier sheet) typically may consist of a mixture of CL750 ceramic body produced by Solid State Dielectric Corp., of Sun Valley, Calif.; Cladan B62 organic binder, and micronsize barium titanate powder, and have unfired thickness between 0.0005 and 0.010 inches. Ceramic compositions produced by TAM division of National Lead are also usable. The ink may consist of known DuPont or Cladan Inc., capacitor electroding inks. End termination inks are produced by Sel Rex Corp.

In FIG. 2, the electrodes are again designated at 11a–11c, and 12a–12c. Multiple columns of electrodes 11a–11c are provided, and multiple columns of electrodes 12a–12c are also provided, as shown. The carrier sheet 100 (corresponding to sheet 10, but much wider, to accommodate the multiple columns) is typically perforated along parallel lines 50a–50n which extend in the direction of arrow 13, and which are laterally spaced apart. Certain of these lines intersect only certain of the electrodes (i.e. lines 50a–50c–50e, etc., intersect only electrodes 11a–11c) in the multiple columns of same; and others of the lines intersect only other of the electrodes (i.e. lines 50b–50d–etc., intersect only electrodes 12a–12c) in the multiple columns of same. As before, the certain electrodes 11a–11c extend in sequentially alternating relation with the other electrodes 12a–12c, in the sheet length direction 13. The perforation of the sheet may be effected prior to or subsequent to electrode application.

Accordingly, after spiral wrap-up, followed by severing along lines 50a–50n, multiple capacitors are formed, each being like the capacitor shown in FIGS. 1, 1a and 1b.

Note in FIG. 2 that the lines 50b–50n−1 typically bisect the rectangular electrodes which they intersect.

Also, end trim locations are indicated at 60–63.

Additional unusual advantages are listed as follows:

A. Cylindrical configuration provided:
1. can be handled by existing automatic insertion equipment due to similarity in shape to resistors.
2. For above reason, many manufacturers package their rectangular chips in cylindrical packages, thus taking a major loss in volumetric efficiency. Applicant's method and design avoids this loss.
3. When "bell-cap" terminated (as in metal film resistors), no encapsulation is necessary.

B. Roll-up method and design:
1. Single-print system: no need for precise registration between several prints; i.e. easier to roll-up.
2. Electrical short immunity: if the "gap line" in FIG. 1a is not radial (indicating any of several problems, including deviation from the expected dielectric thickness, improper trim, etc.), this does not result in a short, but only in a small decrease in capacitance.
3. If desired, labelling information can be printed on the reverse side of the ware, before roll-up.
4. In a production environment, capacitance can easily and reversibly be "trimmed" by selectively blocking out a portion of the print. This can be accomplished with a piece of Mylar tape on the under-side of the screen containing the pattern.

In the above description, "burnout" is typically carried out at about 700° F. prior to roll-up; "firing" is typically carried out after roll-up, and in a kiln, at about 2,400° F.; and the end termination ink is typically fired at about 1,500° F.

The perforations along lines 50a–50n may be severed after roll-up, and before firing, as by manual (or machine) breaking apart of the segments of the roll along the spiral perforation planes. This can be effected very rapidly, and enables subsequent firing with the capacitors arranged as in FIG. 3.

In FIG. 1a, leads or pins to be integral with end caps 26 and 27 are indicated at 26a and 27a.

Referring now to FIG. 5, it shows apparatus 125 to wind a multilayer, tubular electrical component, as by wrapping it about a mandrel 126. In this example, the component includes a carrier sheet 127 as for example a thin sheet of ceramic material suspended in a flexible organic binder such as that referred to above at 10. The component may also include electrodes (not shown) on the sheet 127, as described above.

The apparatus includes first and second support rolls, as for example at 128 and 129, with axes 128a and 129a which extend in generally parallel relation. Roll 128 includes an annular body 130 and end walls 131a closing the roll to form a hollow drum. Roll 128 is typically driven in rotation, as for example by a drive indicated schematically at 130a and connected to roll shaft 131. On-off and forward and reverse controls for the drive appear at 132 and 133. Roll 129 is suitably supported, via its trunnions 234, as by support brackets 135 which are adjustable in support 136. Thus, roll 129 may be adjustably displaced toward and away from roll 128. The external metallic surface 129b of roll 129 may be heated, as for example by internal resistance 138a, whereby that surface may act as a source for transfer of heat into the carrier sheet being wound on the mandrel 126, as will be referred to. Roller 129 is typically of substantially smaller diameter than roller 128.

Also provided is a roll-up force transmitting web 134 wrapping at least partially about the support rolls. The web is adapted to be translated endwise, while the rolls rotate, to wrap the carrier sheet 127 about the mandrel as the sheet feeds progressively between the mandrel and web. The sheet feeds off a support platform 190. Web 134 is shown in FIG. 6 as having a first portion 134a wrapped partially about roll 128, a second portion 134b wrapping about the mandrel 126, and a third portion 134c wrapping partially about the roll 129. As rolls 128 and 129 rotate clockwise, the web feeds counterclockwise about the axis of the mandrel 126.

Tensioning means is operatively coupled with the web to tension the latter so that the mandrel and the electrode carrier sheet 127 (being wrapped on the mandrel) are urged by the web toward a nip region 137 defined between the rolls. In this regard, the tensioning means, generally designated at 138, may include an element 139 engaging a loop 134d of the web, and a spring 148 urging a link 141 connected with element 139 in a web tensioning direction. A holder 142 for the spring and link is pivotally connected at 143 to a bracket 144 mounted on the roll 128, to be rotated therewith. An air cylinder tensioning mechanism may also be used.

As shown in FIGS. 5–7, as the roll 128 rotates clockwise, the tensioning means pulls the web around and off roll 129, and maintains the web portions 134c and 134b and 134a in tension. Thus, the mandrel and the carrier sheet being wound thereon are always forcibly urged to the left, to maintain pressure on the carrier sheet as the latter is clamped between the mandrel on one side and the web and roll 129 on the other side, and also between the mandrel on one side, and the web and roll 128 on the other side. Such pressure exertion on the carrier sheet effects its deformation into a permanently wound configuration about the mandrel, prior to firing, also, the carrier sheet is compressed or "laminated" by such clamping, as required prior to firing, for best results.

Roll 128 has suction transmitting openings 146 through its wall or body 130 opposite the nip 137 at the commencement of roll rotation and ceramic sheet feed into the nip, as shown in FIG. 5. Vacuum maintained in the roll interior and exerted as suction via openings 146 serves to hold the web and sheet 127 adjacent such openings in proper position to approach the lower side of the mandrel, for winding of the sheet about the mandrel. Such vacuum may be suitably maintained, as by a pump 148 mounted to the roll end 131a. The web may be perforated to allow suction transmission therethrough to the carrier sheet to hold the sheet onto the web. As the carrier sheet is wound about the mandrel, heat is conductively transferred to it at the locus of pressurization between roll 129, web 134, carrier sheet 127 and mandrel 126, due to heating of the surface of roll 129 as described above.

FIG. 7 illustrates how the completely wound carrier sheet and mandrel assembly may be loosened relative to the web, to allow removal of the mandrel and carrier sheet. To this end, roll 129 may be displaced upwardly, as by adjustment at 136, or the tensioning means may be relieved, to produce slack in the web. The mandrel, and carrier wound thereon, may then be axially removed; the wound carrier may be slipped off the mandrel, and the mandrel may then be replaced in FIG. 5 position (after return of the rolls and web to FIG. 5 position) to receive another carrier sheet for winding thereon.

The basic wrapping method includes the steps:

(a) providing a carrier sheet having electrodes formed thereon in spaced relation along a length dimension of the sheet, and (b) spirally rolling the sheet about a roll-up axis to bring the electrodes into radial registration, such rolling including transmitting roll-up force to the carrier sheet from a web being translated endwise, adjacent the carrier.

Additonal steps include: exerting tension on the web as it translates endwise: rotating the roll surfaces in response to translation of the web in engagement therewith; applying suction to hold the web against one of the roll surfaces at the carrier input stage; feeding the carrier sheet between the web and a mandrel which has been located to receive roll-up of the carrier; and transferring heat into the carrier sheet as it is rolled.

The web may for example comprise polyester fabric, with −400 mesh. Web end 134e is anchored at 150 to roll 128.

In the above, the electrodes may be located at the web side of the carrier sheet, or at the opposite side of the carrier sheet.

I claim:

1. In apparatus to fabricate a multilayer tubular electrical component that comprises a laminated electrode and carrier sheet assembly, by wrapping the assembly about a mandrel the combination comprising
   (a) a first support roll,
   (b) a second support roll extending generally parallel to the first support roll,
   (c) a roll-up force transmitting web wrapping at least partially about the support rolls and which web is translated while the rolls rotate to wrap the sheet about the mandrel as the sheet feeds progressively between the mandrel and web, and
   (d) yieldable tensioning means operatively connected with the web to tension the web so that the mandrel and the carrier sheet being wrapped thereon are urged by the web toward a nip defined between said rolls, said tensioning means being carried by one of the rolls and being connected to a portion of the web between the tensioning means and the other of the rolls,
   (e) said mandrel about which the web partially wraps as the web is translated from wrapping engagement with one roll to wrapping engagement with the other roll,
   (f) and heating means for heating the web wrapping about the mandrel.

2. The apparatus of claim 1 wherein the web is translated from wrapping engagement with one roll to wrapping engagement with the other roll during wrapping of the sheet about the mandrel, said one roll having suction transmitting openings to hold the web and sheet adjacent said one roll as the sheet is fed toward a nip defined between the rolls.

3. The apparatus of claim 1 wherein the sheet is translated from wrapping engagement with the first roll to wrapping engagement with the second roll during wrapping of the sheet about the mandrel, at least one of the rolls being heated by said heating means to transmit heat via the web to the sheet being wrapped about the mandrel.

4. The apparatus of claim 2 wherein the other and smaller of said rolls carries said heating means for transfer of heat via the web to the sheet being wrapped about the mandrel.

5. The apparatus of claim 1 wherein said carrier sheet is fed endwise between the web and mandrel for wrapping about the mandrel.

6. The apparatus of claim 1 including means associated with at least one of said rolls to adjust the width of a gap defined at a nip between the rolls.

7. The method of forming electrical structures, that includes:
   (a) providing a carrier sheet having electrodes formed thereon in spaced relation along a length dimension of the sheet,
   (b) spirally rolling said sheet about a roll-up axis to bring said electrodes into radial registration, said rolling including transmitting roll-up force to the carrier sheet from a web being translated endwise, adjacent the carrier,
   (c) controllably exerting yieldable tension on said web as it translates endwise,
   (d) providing back-up roll surfaces against which the web is urged during said rolling, in response to the tension exertion,
   (e) locating a mandrel to receive roll-up of the carrier sheet with the carrier sheet located between the mandrel and the web, and
   (f) transferring heat via the tensioned web to the carrier sheet as it is rolled up about the mandrel.

8. The method of claim 7 including rotating said roll surfaces in response to the translation of the web.

9. The method of claim 8 including applying suction to hold the carrier sheet and the translating web positioned adjacent one of said roll surfaces during the web translation.

10. The method of claim 7 including feeding the carrier between the web and mandrel.

11. The method of claim 7 including the step of preliminarily forming the electrodes on the sheet to have progressively increasing length along a sheet length dimension.

12. The method of claim 11 wherein said forming of the electrodes is carried out by depositing metallic ink on the sheet, and allowing the ink to solidify.

13. The method of claim 12 wherein the ink consists of conductive metal powder in a liquid vehicle, and said step of allowing the ink to solidify includes vaporizing said vehicle to deposit the metal powder on the sheet.

14. The method of claim 11 wherein said forming of the electrodes includes locating certain electrodes to have edges in a first line extending in the direction of said length dimension, and locating other electrodes to have edges in a second line extending in the direction of said length dimension, said certain electrodes located to be everywhere spaced from said second line, and said other electrodes located to be everywhere spaced from said first line.

15. The method of claim 14 including forming first and second end terminals on the rolled up sheet so that the first terminal is in electrical contact with certain electrodes and the second terminal is in electrical contact with others of the electrodes which extend in alternating relation with the certain electrodes.

16. The method of claim 7 wherein the sheet consists of ceramic material sufficiently thin to be spirally rolled about the mandrel.

17. The method of claim 11 including arranging the electrodes in multiple parallel columns spaced apart laterally in a direction normal to a sheet length dimension.

18. The method of claim 17 including perforating the sheet along parallel lines which are laterally spaced apart and which extend in the direction of said length dimension, certain of said lines intersecting only certain of the electrodes and other of the lines intersecting only other of the electrodes which extend in alternating relation with the certain electrodes.

19. The method of claim 18 that includes severing the sheet along the perforated lines to provide multiple capacitors, after the roll-up.

20. The method of claim 19 including providing first and second end terminals on the rolled sheet associated with each capacitor so that the first terminal is in electrical contact with certain electrodes and the second terminal is in electrical contact with other of the electrodes which extend in alternating relation with the certain electrodes.

21. The method of claim 20 including subjecting the capacitors to elevated temperature to cure said electrodes.

22. In apparatus to fabricate a multilayer tubular electrical component that comprises a laminated electrode and carrier sheet assembly, by wrapping the assembly about a mandrel the combination comprising
   (a) a first support roll,
   (b) a second support extending generally parallel to the first support roll, and
   (c) a roll-up force transmitting web wrapping at least partially about the first roll and for local translation while the first roll rotates to wrap the sheet about the mandrel as the sheet feeds progressively between the mandrel and web,
   (d) yieldable tensioning means operatively connected with the web to tension the web so that the mandrel and the sheet being wrapped thereon are urged by the web toward a nip defined between said roll and said second support, said tensioning means operatively connected to the support and to the web to controllably urge the mandrel and sheet wrapped thereon toward said nip,
   (e) said mandrel about which the web partially wraps,
   (f) and heating means for heating the web wrapping about the mandrel.

23. The method of forming electrical structures, that includes:
   (a) providing a carrier sheet having electrodes formed thereon in spaced relation along a length dimension of the sheet,
   (b) spirally rolling said sheet about a roll-up axis to bring said electrodes into radial registration, said rolling including transmitting roll-up force to the carrier sheet from a web adjacent the carrier, one of said sheet and web undergoing endwise translation relative to the other,
   (e) controllably exerting yieldable tension on said web during said endwise translation,
   (d) providing controllably spaced back-up roll surfaces against which the web is urged during said rolling, in response to the tension exertion,
   (e) locating a mandrel to receive roll-up of the carrier sheet with the carrier sheet located between the mandrel and the web, and
   (f) transferring heat via the tensioned web to the carrier sheet as it is rolled up about the mandrel.

* * * * *